(12) United States Patent
Dhaniyala et al.

(10) Patent No.: US 12,510,444 B2
(45) Date of Patent: Dec. 30, 2025

(54) ELECTROSTATIC PRECIPITATION-BASED SAMPLER FOR BIOAEROSOL MONITORING

(71) Applicant: TelosAir Corp., Potsdam, NY (US)

(72) Inventors: Suresh Dhaniyala, Potsdam, NY (US);
Shantanu Sur, Potsdam, NY (US);
Adam Chrzan, Potsdam, NY (US);
Hema Priyamvada Ravindran, Potsdam, NY (US)

(73) Assignee: TelosAir Corp., Potsdam, NY (US)

( * ) Notice: Subject to any disclaimer, the term of this patent is extended or adjusted under 35 U.S.C. 154(b) by 714 days.

(21) Appl. No.: 17/758,040

(22) PCT Filed: Jul. 21, 2021

(86) PCT No.: PCT/US2021/042592
§ 371 (c)(1),
(2) Date: Jun. 27, 2022

(87) PCT Pub. No.: WO2022/020482
PCT Pub. Date: Jan. 27, 2022

(65) Prior Publication Data
US 2023/0047306 A1    Feb. 16, 2023

Related U.S. Application Data

(60) Provisional application No. 63/054,962, filed on Jul. 22, 2020.

(51) Int. Cl.
*G01N 1/22* (2006.01)
*B03C 3/47* (2006.01)
(Continued)

(52) U.S. Cl.
CPC ............. *G01N 1/2202* (2013.01); *B03C 3/47* (2013.01); *G01N 1/2273* (2013.01);
(Continued)

(58) Field of Classification Search
CPC .... B03C 3/08; B03C 3/12; B03C 3/41; B03C 3/47; B03C 3/017; G01N 2001/2223;
(Continued)

(56) References Cited

U.S. PATENT DOCUMENTS 3,413,545 A * 11/1968 Whitby .............. G01N 15/0266
324/459
3,520,172 A *  7/1970 Liu ...................... G01N 1/2202
96/60
(Continued)

FOREIGN PATENT DOCUMENTS

DE    102017208849 A1 * 11/2018 ......... G01N 15/0656
DE    102018218918 A1 *  5/2020 ............... B03C 3/38
(Continued)

OTHER PUBLICATIONS

Foat, T.G. et al., A Prototype Personal Aerosol Sampler Based on ESP and Electrowetting-on-Dielectric Actuation of Droplets; Journal of Aerosol Science; 95 (2016) pp. 43-53 (Year: 2016).*

*Primary Examiner* — Jennifer Dieterle
*Assistant Examiner* — Sonji Turner
(74) *Attorney, Agent, or Firm* — Downs Rachlin Martin PLLC

(57) ABSTRACT

A compact, portable, low-cost electrostatic bioaerosol sampler device is provided for collection of aerosolized biological and non-biological particles. The device may be used for long-term, large-scale deployment. With a low-pressure design, the device can sample a high flowrate of 10 lit/min with a low-power fan. The device collects dust particles with a nominal size range of 1-10 μm, with an efficiency of >60%. The device may include aerosol sensing components, a particle ionizer, and an electrostatic precipitator. A removable cassette includes a ground plate for collection of ionized particles and a high voltage plate opposite the (Continued)

ground plate. A divider may be included beneath the ionizer to facilitate separation of collected particles by size on the ground plate.

20 Claims, 20 Drawing Sheets

(51) Int. Cl.
*G01N 15/00* (2024.01)
*G01N 15/02* (2024.01)
(52) U.S. Cl.
CPC . *G01N 15/0266* (2013.01); *G01N 2015/0038* (2013.01); *G01N 2015/0046* (2013.01)
(58) Field of Classification Search
CPC ........... G01N 2001/245; G01N 1/2202; G01N 1/2273; G01N 2015/0038; G01N 2015/0046; G01N 15/0266; G01N 15/01; G01N 15/075; G01N 15/0227; G01N 15/06
See application file for complete search history.

(56) References Cited

U.S. PATENT DOCUMENTS

| | | | | |
|---|---|---|---|---|
| 3,526,828 A * | 9/1970 | Whitby | ............. | G01N 15/0656 96/60 |
| 3,718,029 A * | 2/1973 | Gourdine | ............... | G01N 27/60 96/26 |
| 3,907,520 A * | 9/1975 | Huang | ...................... | B03C 3/12 204/157.4 |
| 5,290,343 A * | 3/1994 | Morita | ..................... | B03C 3/12 96/99 |
| 5,915,977 A * | 6/1999 | Hembree | .......... | H01L 21/67144 439/74 |
| 6,551,383 B1 * | 4/2003 | Richardson, Jr. | ...... | B01D 46/62 96/138 |
| 7,298,486 B2 * | 11/2007 | Wang | ................. | G01N 15/0266 356/438 |
| 7,361,207 B1 * | 4/2008 | Coffey | .................... | B03C 3/383 95/79 |
| 8,043,412 B2 * | 10/2011 | Carlson | .................... | B03C 3/08 95/79 |
| 8,301,396 B1 * | 10/2012 | Dhanijala | ................. | B03C 3/12 702/24 |
| 10,859,485 B2 * | 12/2020 | Marra | ................ | G01N 15/0656 |
| 2005/0156118 A1 * | 7/2005 | Chua | ........................ | B03C 3/47 250/426 |
| 2005/0193803 A1 * | 9/2005 | Carlson | .................... | B03C 3/08 73/28.02 |
| 2006/0150754 A1 * | 7/2006 | Burtscher | ................ | B03C 3/12 73/865.5 |
| 2009/0301299 A1 * | 12/2009 | Carlson | .................... | B03C 3/32 96/61 |
| 2011/0216317 A1 * | 9/2011 | Marra | ....................... | B03C 3/47 73/865.5 |
| 2013/0042893 A1 * | 2/2013 | Ariessohn | ................ | B03C 3/12 137/560 |
| 2014/0170645 A1 * | 6/2014 | Jovanovich | ....... | B01L 3/502715 435/6.12 |
| 2017/0108425 A1 * | 4/2017 | Dhaniyala | .......... | G01N 15/0266 |
| 2019/0063763 A1 * | 2/2019 | Kleinberger | ........... | B01D 46/521 |
| 2019/0346357 A1 * | 11/2019 | Mizuno | .................. | B03C 3/017 |
| 2020/0182769 A1 * | 6/2020 | Okumura | .................. | G01F 1/68 |
| 2020/0200667 A1 * | 6/2020 | Kanno | ................... | G01N 27/60 |
| 2020/0209134 A1 * | 7/2020 | Kanno | ...................... | B03C 3/86 |
| 2020/0348220 A1 * | 11/2020 | Kanno | ................... | B03C 3/017 |

FOREIGN PATENT DOCUMENTS

| | | | | |
|---|---|---|---|---|
| EP | 1681551 A1 * | 7/2006 | ............ | B03C 3/017 |
| EP | 2264429 A1 * | 12/2010 | ............ | B03C 3/017 |
| EP | 2860510 A1 * | 4/2015 | ............ | B03C 3/017 |
| JP | 2008102038 A * | 5/2008 | | |
| WO | WO-2019020373 A1 * | 1/2019 | ......... | G01N 15/0656 |

* cited by examiner

ELECTROSTATIC PRECIPITATION-BASED SAMPLER FOR BIOAEROSOL MONITORING

FIELD OF THE INVENTION

The present invention generally relates to air quality sensors. In particular, the present invention is directed to an electrostatic precipitation-based sampler for bioaerosol monitoring.

BACKGROUND

Understanding the airborne migration of pathogens and the consequent transmission of diseases and other health effects requires an ability to monitor bioaerosol at high spatiotemporal resolution. Exposure to biological aerosols can be detrimental to human health as they could cause infectious diseases, acute or chronic toxic reactions, and allergies. The role of infectious bioaerosol in disease transmission has been widely acknowledged, yet remains poorly understood. Recent disease outbreaks such as *Candida auris*, Severe Acute Respiratory Syndrome coronavirus (SARS-CoV), and Middle East Respiratory Syndrome coronavirus (MERS-CoV) caused by emerging fungi and viruses highlight the importance of bioaerosol monitoring in public health.

As humans spend over 90% of their times indoors, there is a particular need to understand the generation, dispersion, and fate of infectious agents in built environments. Modeling disease transmission in indoor spaces requires an understanding of airborne movement of particles and their deposition onto different surfaces. To predict transport characteristics and fate of aerosolized pathogens, bioaerosol samplers that can be widely deployed are required. In addition, bioaerosol monitoring is essential for controlling the overall air quality, assessment of health risks due to microbial exposure, identification of emission sources, and estimating the efficiency of ventilation and other air cleaning interventions. Bioaerosol studies in hospitals are also becoming increasingly important to address the problem of healthcare-associated infections (HAIs), a growing global public-health issue. Many HAI pathogens, e.g., *Mycobacterium tuberculosis* and many viruses such as influenza virus, norovirus, and corona virus (SARS and SARS-CoV-2), are predominantly transmitted through air and cause outbreaks in hospitals and other built environments.

Impingement, impaction, and filtration are the widely used techniques for collection of bioaerosols in both indoor and outdoor environments. The inertial and filtration-based sampling techniques are labor intensive, time consuming, and power-intensive. Also, the widely applied inertial and filtration-based techniques have been proven to be inefficient for capturing smaller pathogens such as virus (≤100 nm). Due to such difficulties, the ability to conduct bioaerosol sampling in critical environments, such as hospitals, day care centers, and other built environments, remains limited.

Electrostatic based air samplers have been developed and applied for environmental and personal sampling. Electrostatic samplers are advantageous over other techniques as they have lower power requirements, lower impaction stress, and lower pressure drop, thus enabling its application for long term aerosol particle measurements.

However, there is a need for bioaerosol samplers that are easy to deploy and optimized for downstream analysis.

SUMMARY OF THE DISCLOSURE

An apparatus for collecting bioaerosols includes a housing having a proximal side, a distal side, an inlet port on the proximal side, an outlet port on the distal side, and a cassette port. A fan is configured to draw air into the housing through the inlet port and out the outlet port, an ionizer in the housing is configured to ionize particles entering through the inlet port, and a cassette is configured to be received in the cassette port. The cassette includes a voltage plate electrically coupled to a power source when the cassette is in the housing and a ground plate opposite the voltage plate, wherein the ionizer is proximal to the voltage plate and the ground plate and wherein ionized particles in air flowing through the apparatus are precipitated on the ground plate when the voltage plate is charged.

Additionally or alternatively, a first sensor is included near the inlet port that detects airborne particles before the airborne particles pass the ionizer and a second sensor near the outlet port for detecting airborne particles after the airborne particles pass the ground plate.

Additionally or alternatively, a funnel is located between the ground plate and the outlet port, wherein the funnel expands from the ground plate to the outlet port and includes a portal configured to allow air to pass to the send sensor.

Additionally or alternatively, the first sensor measures a number and mass concentration of aerosol in the size range of 0.3 µm to 10 µm and wherein the second sensor measures a number and mass concentration of aerosol in the size range of 0.3 µm to 10 µm.

Additionally or alternatively, a divider is positioned in the housing beneath the ionizer configured such that a first portion of air drawn in through the inlet port passes between the divider and the ionizer and a second portion of air drawn in through the inlet port passes below the divider, wherein the divider limits ionization of airborne particles beneath divider.

Additionally or alternatively, the voltage plate is charged to 5000 V DC.

Additionally or alternatively, an electric field between the voltage plate and the ground plate is 8 kV/cm.

Additionally or alternatively, air is drawn through the device at 10 lit/min.

Additionally or alternatively, the ground plate and the voltage plate are separated by 4 mm.

Additionally or alternatively, the cassette engages a limit switch when inserted into the apparatus such that the limit switch actuates the power source.

Additionally or alternatively, when the cassette is inserted in the apparatus, a first conductive contact member engages the voltage plate on one end and is electrically coupled to the power source on another end.

Additionally or alternatively, when the cassette is inserted in the apparatus, a second conductive contact member engages the ground plate on one end and is electrically coupled to ground on another end.

Additionally or alternatively, the first conductive contact member includes a horizontally oriented spring-loaded pin that is electrically coupled to the power source when the cassette is inserted in the apparatus.

Additionally or alternatively, the first conductive contact member includes a vertically oriented spring-loaded pin that is electrically coupled to a downward facing face of the voltage plate and is electrically coupled to the power source only when the cassette is inserted in the apparatus.

Additionally or alternatively, the second conductive contact member includes a horizontally oriented spring-loaded pin that is electrically coupled to the ground when the cassette is inserted in the apparatus.

Additionally or alternatively, the second conductive contact member includes a vertically oriented spring-loaded pin that is electrically coupled to an upward facing face of the ground plate and is electrically coupled to ground through the apparatus only when the cassette is inserted in the apparatus Additionally or alternatively, the ground plate is conductive glass.

Additionally or alternatively, the cassette includes an RFID tag.

Additionally or alternatively, the cassette is secured in the housing via a magnetic plate.

Additionally or alternatively, a path from the inlet port to the outlet port is straight.

In another embodiment, a method for assessing particles in air includes inserting a cassette into a container, wherein the cassette includes a high voltage plate and a ground plate parallel to the high voltage plate, wherein the high voltage plate is electrically coupled to a power source in the container when the cassette is inserted in the container, and wherein the ground plate is electrically coupled to ground when the cassette is inserted in the container. Air is drawn into the container with a fan, wherein air drawn into the container has a straight path through the container. Particles in the drawn in air are ionized in an ionizing region of the container and the air with ionized particles is drawn from the ionizing region to a precipitation region in the container, wherein the precipitation region includes the high voltage plate and the ground plate. At least a portion of the ionized particles are precipitated on the ground plate by maintaining an electric field across the high voltage plate and the ground plate, and the cassette is removed from the container.

Additionally or alternatively, a number of collected particles are estimated by determining a first number of particles in the drawn in air using a first sensor prior to the precipitating, determining a second number of particles in the drawn in air using a second sensor after the precipitating, and comparing the first number to the second number after a period of time.

Additionally or alternatively, the cassette is associated with an ID and associating the ID with a date, a time, and a location of insertion into the container.

Additionally or alternatively, data related to the number of collected particles is sent to a processor that is remote from the container.

Additionally or alternatively, a size of the particles in the drawn in air is determined and the data includes information related to the size of the particles.

Additionally or alternatively, whether the number of collected particles exceeds a threshold number of particles is determined and, when the number of collected particles exceeds the threshold number of particles, sending a notice to a user to remove the cassette from the container.

Additionally or alternatively, whether the number of collected particles exceeds a threshold number of particles is determined and, when the number of collected particles exceeds the threshold number of particles, discontinuing the electric field.

Additionally or alternatively, the drawn in air is divided with a divider that shields a portion of the drawn in air from the ionizing.

Additionally or alternatively, the portion of the ionized particles precipitated on the ground plate are separated by size.

Additionally or alternatively, a voltage applied to the high voltage plate is adjusted from 0 V DC to 5000 V DC.

Additionally or alternatively, the ground plate is removed from the cassette after the precipitating.

In another embodiment, a cassette for collection of sampled bioaerosols includes an upper portion, a lower portion, a voltage plate configured to be held in the upper portion, a ground plate configured to be held in the lower portion, wherein the voltage plate is opposite and parallel to the ground plate when the voltage plate is in the upper portion and the ground plate is in the lower portion. A first conductive contact member is attached to the upper portion, wherein the first conductive contact member includes a first horizontally oriented spring-loaded pin extending from a rear of the upper portion and a first vertically oriented spring-loaded pin that is electrically coupled to a downward facing face of the voltage plate and the first horizontally oriented spring-loaded pin. A second conductive contact member is attached to the lower portion, wherein the second conductive contact member includes a second horizontally oriented spring-loaded pin extending from a rear of the lower portion and a second vertically oriented spring-loaded pin that is electrically coupled to an upward facing face of the ground plate and the second horizontally oriented spring-loaded pin.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
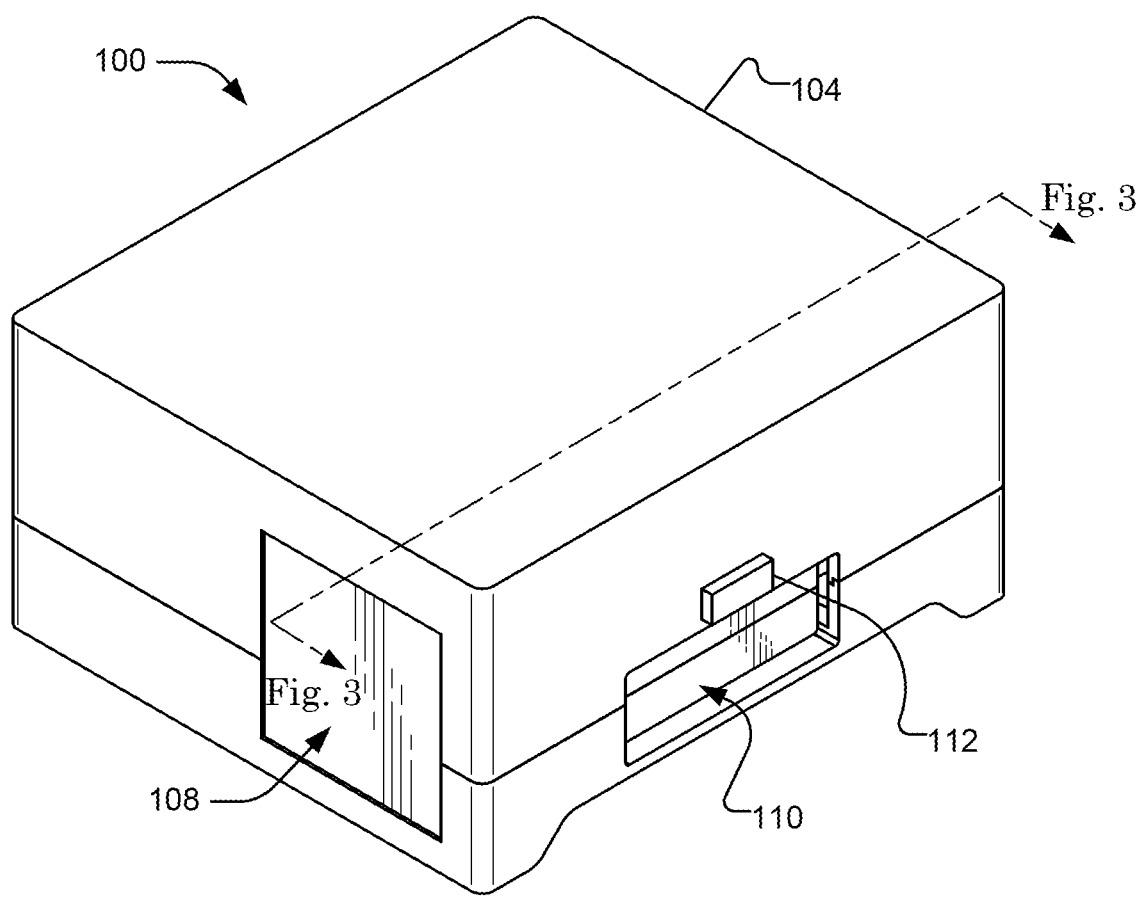
FIG. 1 is a perspective view of a bioaerosol monitoring device in accordance with an embodiment of the present invention.

A compact, portable, low-cost electrostatic bioaerosol sampler device collects and monitors aerosolized biological and non-biological particles. The device is designed so that long-term, large-scale deployment of such devices is feasible. With a low-pressure design, the device can sample a relatively high flowrate, such as 10 lit/min, with a low-power fan. The device collects dust particles with a nominal size range of 10 nm to 10 μm, with an efficiency of >60%. When tested with nebulized Btk spores, the electrostatic precipitator in the device collected 45% of the particles in the absence of a charging unit upstream. With an ionizer placed upstream of the precipitator, and its orientation optimized for charging performance, the collection efficiency of the device for Btk spores increased to >75%.

Because of the device's low-power requirement, absence of any need for a working fluid, low-cost, integration into a single unit, and efficient inactivation of the collected sampler, it is suitable for long term field sampling in diverse indoor and outdoor locations.

The device of the present invention integrates aerosol sensing with bioaerosol sampling using electrostatic precipitation. The device may be designed to collect particles in the size range of 0.01-10 μm, which allows for a wide range of downstream microbial analysis. A particle charger may also be integrated into the device to improve collection efficiency of sampled particles. In a preferred embodiment, the charger is oriented parallel to the particle flow. In an example, over 50% of biological and non-biological test particles were collected in the device when operated with an ionizer and a precipitation electric field of 8 kV/cm.

The device is suitable for a wide range of bioaerosol monitoring in indoor and outdoor environments. With aerosol sensing and electrostatic particle collection components in a single hand-held, portable device, routine, large-scale air quality monitoring and bioaerosol sampling are possible. As noted, the device may collect aerosol particles of a wide size range (0.01-10 μm), and so may be appropriate for monitoring many types of bioaerosols, such as bacteria, fungi, and pollens, as well as various species of virus, algae, archaea, and viridiplantae.

In operation, aerosol particles are drawn into the device in an air stream and electrically charged and then collected onto a substrate by electrostatic force. The air flow through the device is preferably driven by a small, noiseless, low-cost, 12 V DC fan, which allows the device to be pump-less, small (e.g., 21×8.5×8 cm), and light weight, and therefore suitable for a wide-range of field applications. The device further includes an air ionizer for particle charging and for electrostatic precipitation. In a preferred embodiment, the device is configured so that the air flowing through the device flows without passing through turns or junctures that create pressure gradients or turbulence. In addition, the removable cartridge or cassette (that contains the collection plate) may include an RFID tag or other suitable mechanism that allows the device to read and record the cassette's ID so that the cassette's location during collection and time of collection will be associated with the cassette and thus easily accessible when further analysis is performed on the collected particles. The cassette may include a collection plate made of any suitable material, including conductive glass or steel, and may include agar to facilitate growth of the collected particles if desired.

In a preferred embodiment, for ease of fabrication, the device is designed such that it can be manufactured by injection molding or 3D printing. For ease of operation, the device may be fully self-contained, compact, and use low power. Also, the device does not require any working fluid or regular maintenance and may be autonomously operable.

Figure 2:
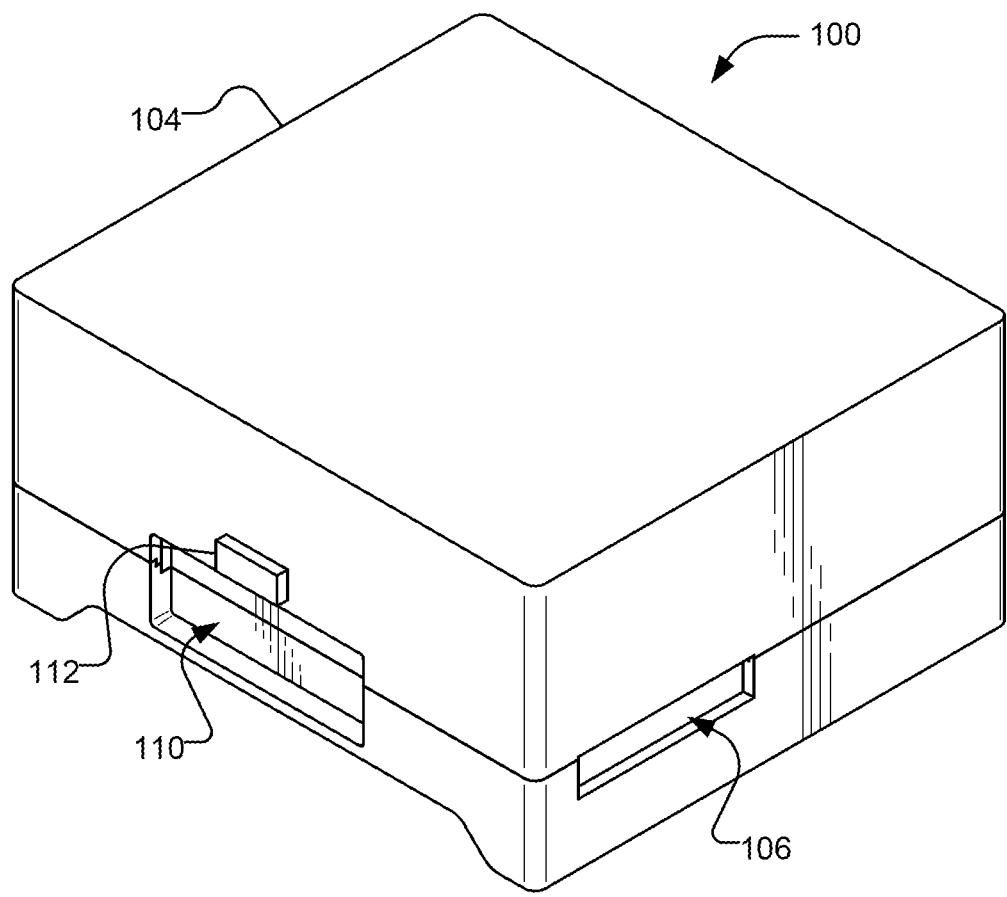
FIG. 2 is another perspective view of the device of FIG. 1.

Turning to the figures, in FIG. 1 a bioaerosol monitoring device 100 is shown that includes a housing 104 having an inlet port 106 on one side (as can be seen in FIG. 2) and an outlet port 108 on a side opposite the inlet port. In addition, a cartridge or cassette port 110 is included, preferably between inlet port 106 and outlet port 108 and including an ejection button 112 or similar mechanism for ejecting an inserted cassette.

Figure 3:
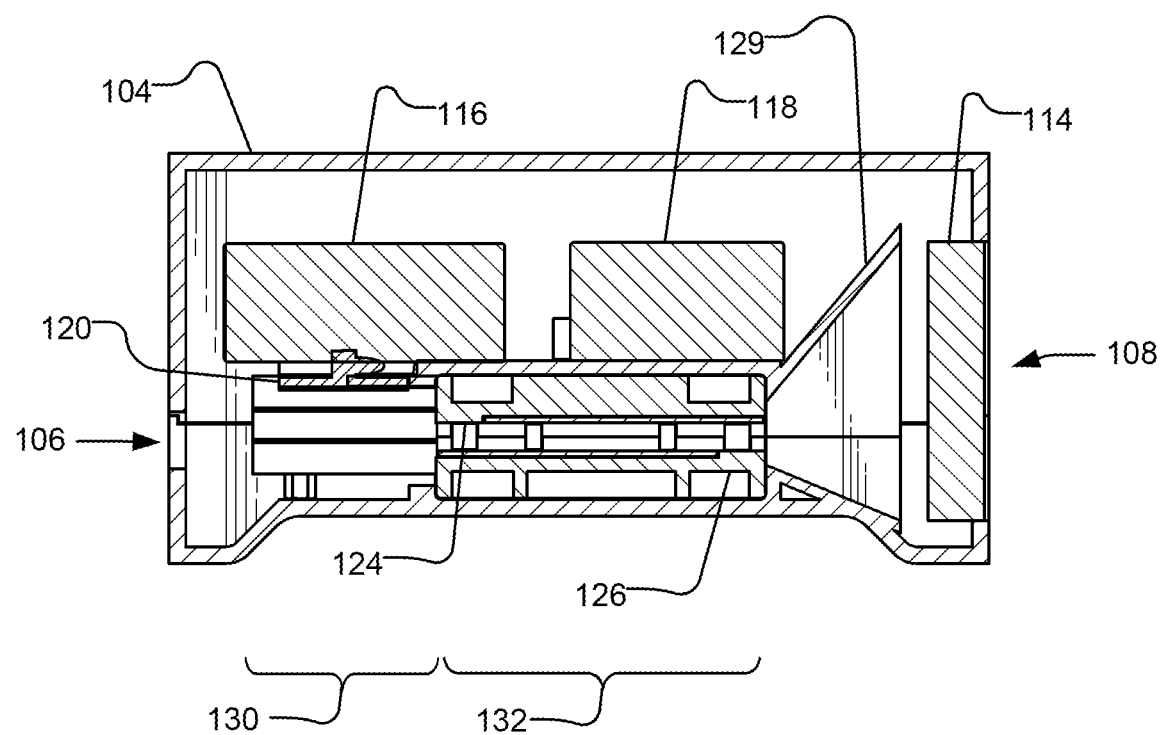
FIG. 3 is a cross section side view of the device shown in FIG. 1.

In FIG. 3, a cross sectional view of device 100 is shown, in which an ionization region 130 and a precipitation region 132 are indicated. In addition, a region between precipitation region 132 and outlet 108 is defined by a cone-shaped funnel 129 or similar structure that expands toward outlet 108 to assist with low pressure operation. As can be seen, the path for airflow through device 100 is relatively straight, which minimizes turbulence and the redistribution of particles (e.g., based on size or weight) that can occur when airflow passes through turns or corners.

Figure 4:
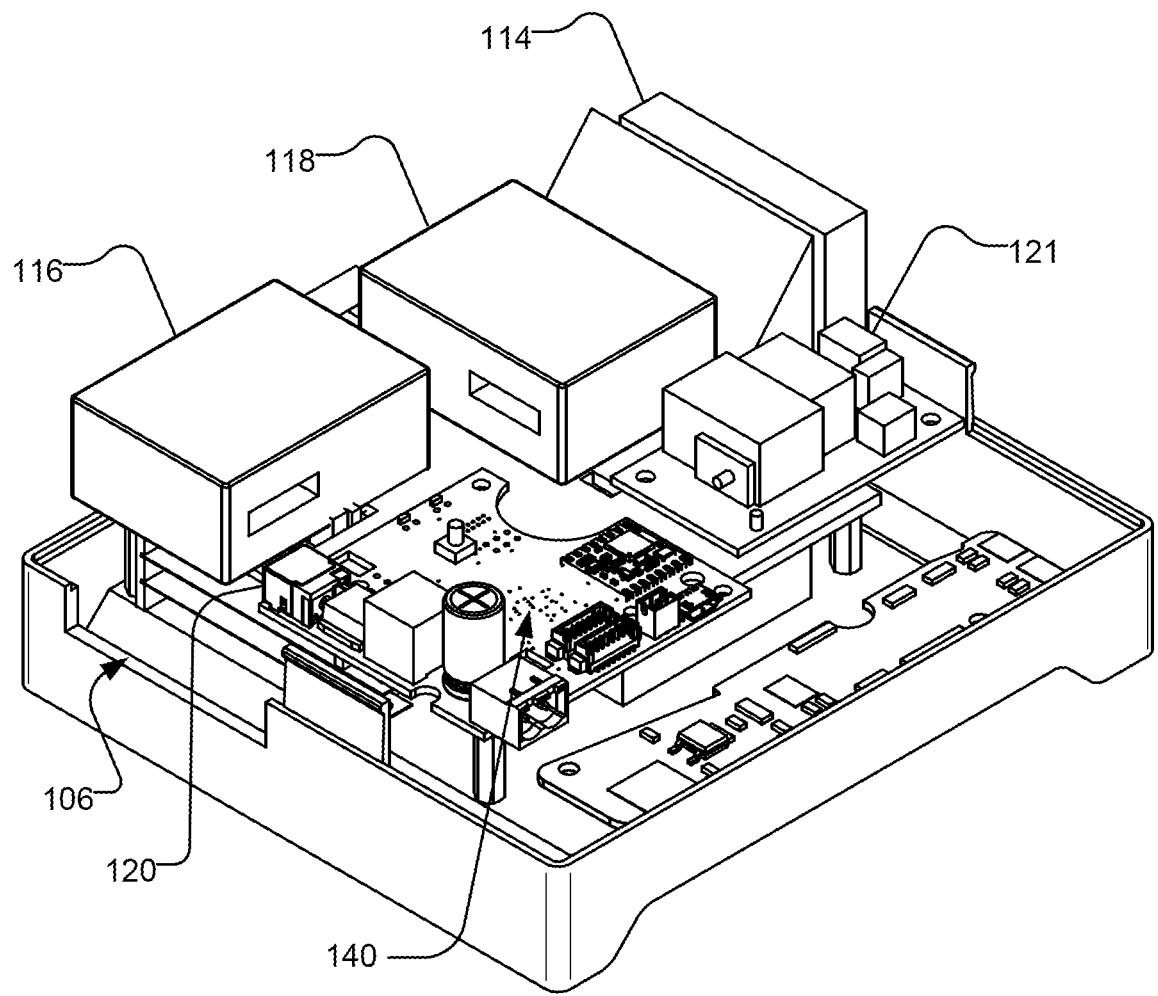
FIG. 4 is a perspective view of the device of FIG. 1 with a top portion of the housing removed to show inner components.
Figure 5:
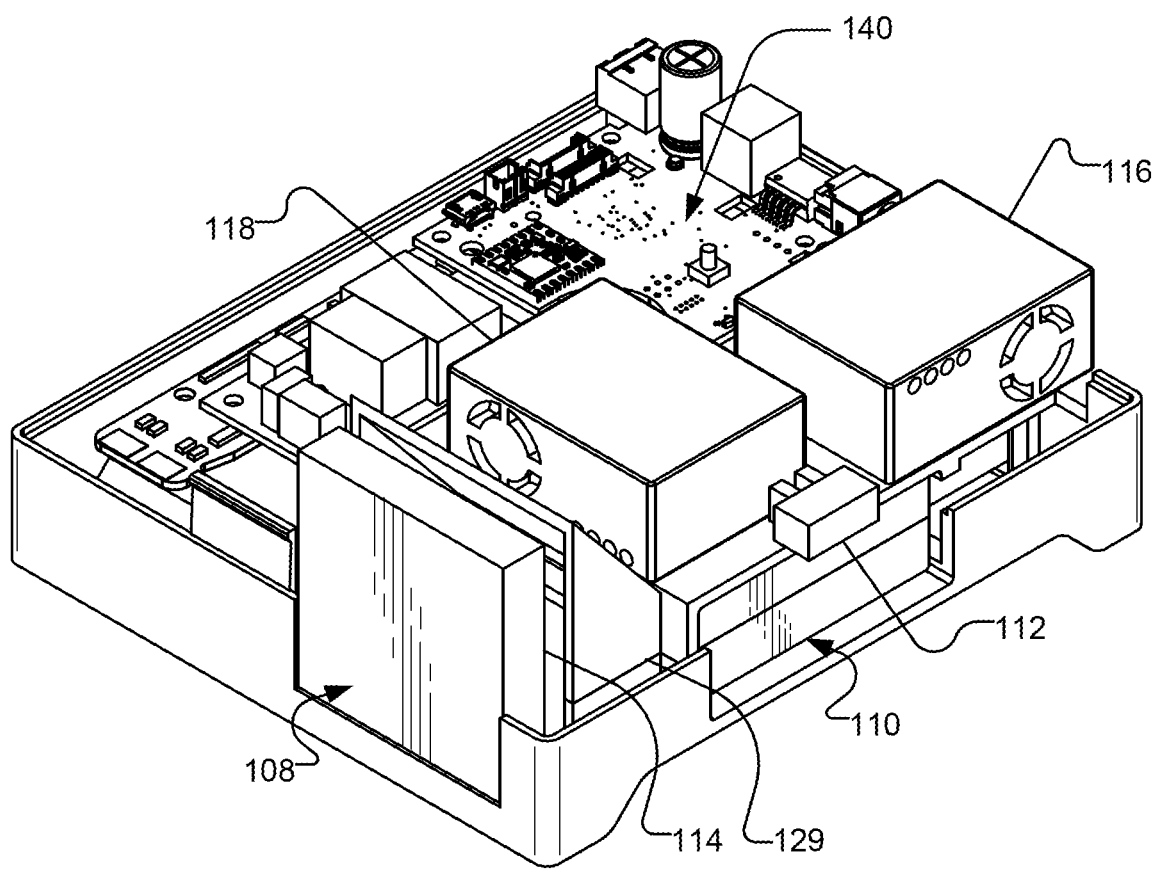
FIG. 5 is another perspective view of the uncovered device of FIG. 4.

Turning to FIGS. 4-5, device 100 is shown with a portion of housing 104 removed to show inner components, which include a fan 114 for creating airflow through device 100 (in particular in through inlet port 106 and out through outlet port 108), a first sensor 116 near inlet port 106 for measuring airborne particle concentrations of air coming in to device 100, a second sensor 118 near outlet port 108 for detecting or measuring airborne particle concentrations in air after a portion of particles have been precipitated in device 100, an ionizer 120 for ionizing particles as they enter device 100, and an electric power source, such as power source 121.

Figure 6:
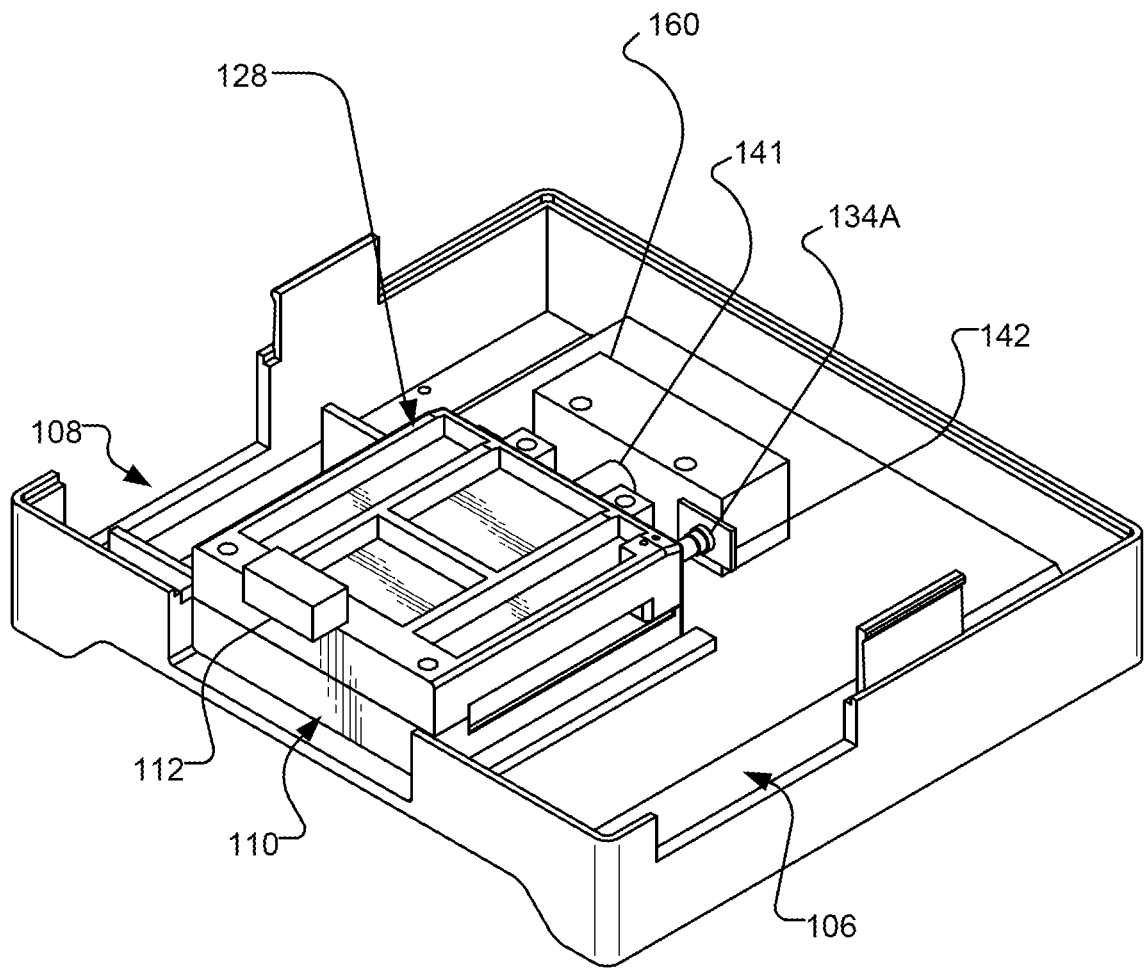
FIG. 6 is a perspective view of the device of FIG. 3 with some of the inner components removed to show a cartridge articulating with the device.
Figure 7:
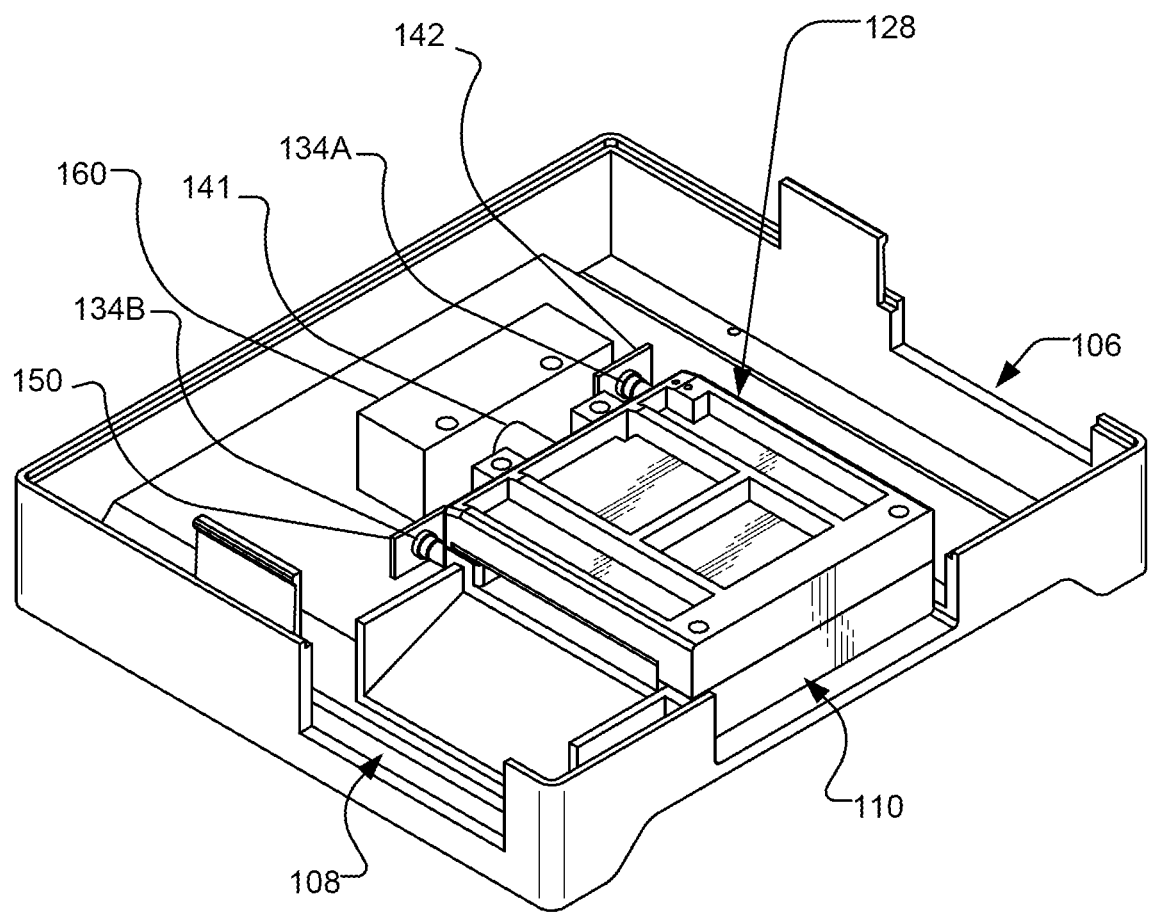
FIG. 7 is another perspective view of the device as shown in FIG. 6.
Figure 8:
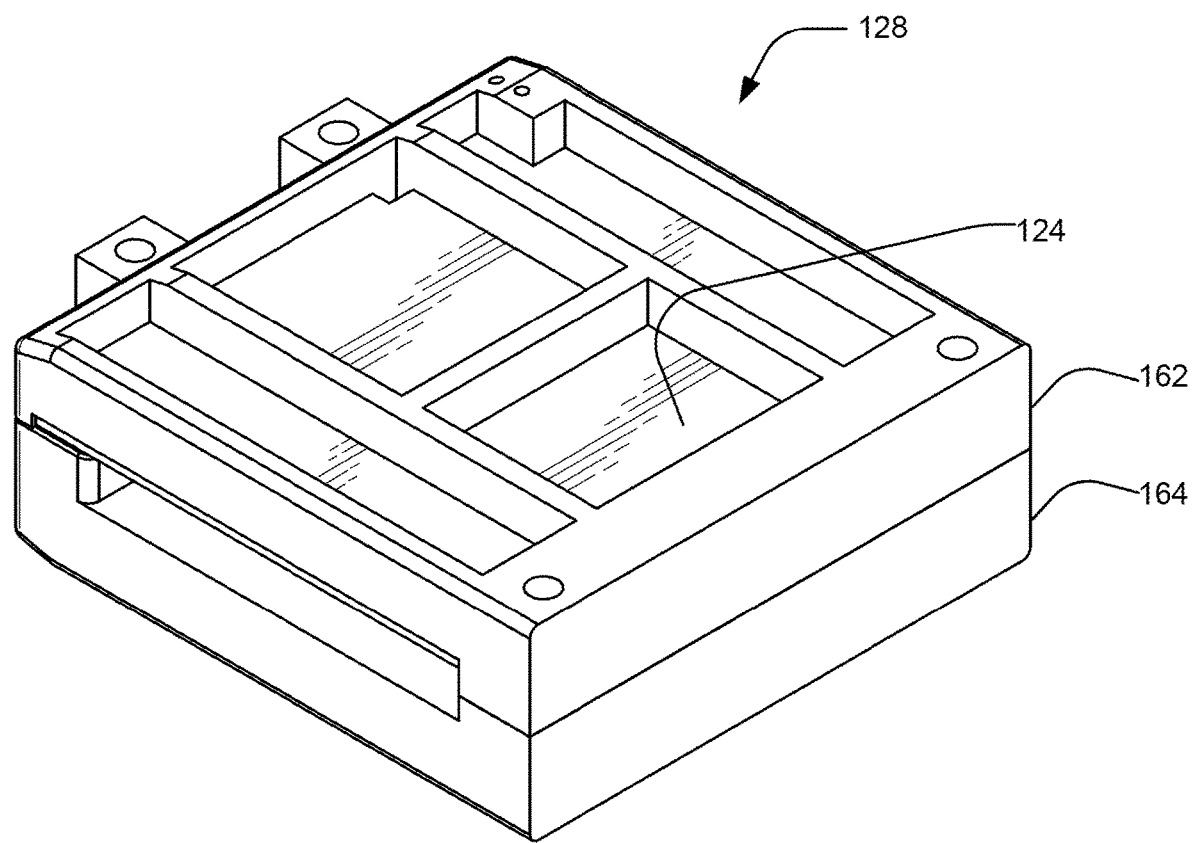
FIG. 8 is a perspective view of a cartridge shown apart from the device.
Figure 9:
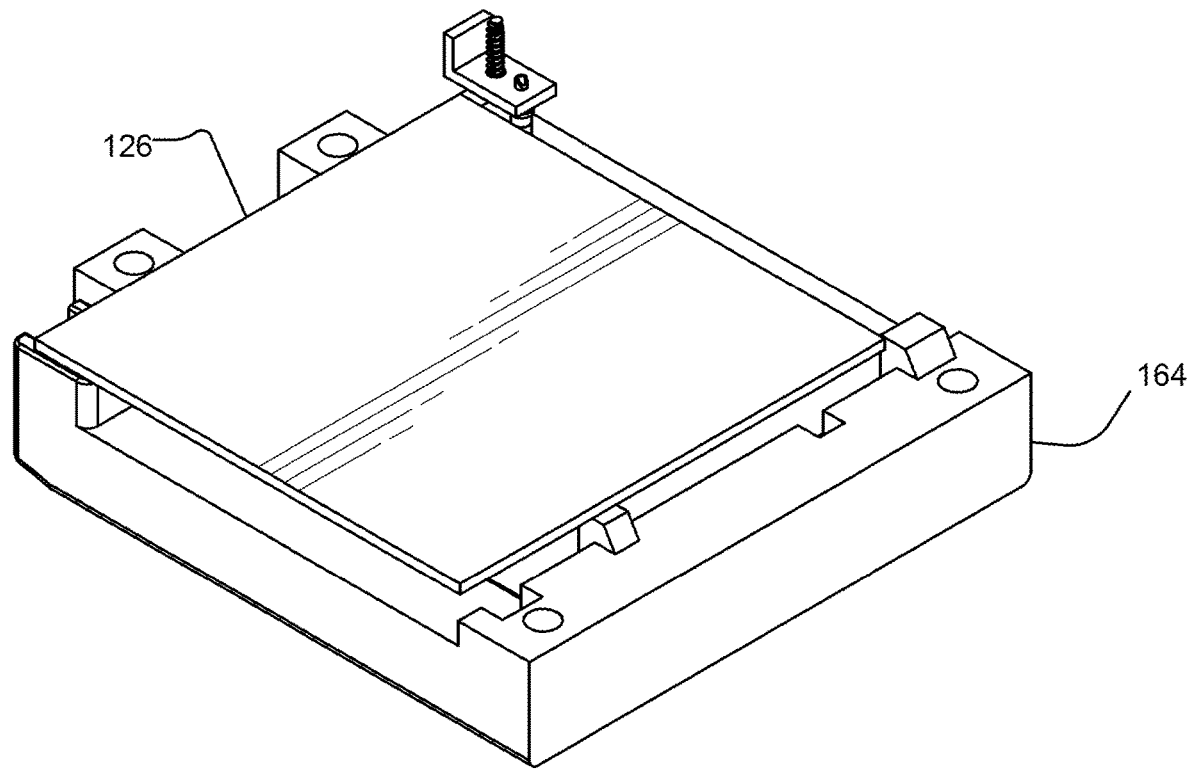
FIG. 9 is a perspective view of a portion of the cartridge shown in FIG. 8.
Figure 10:
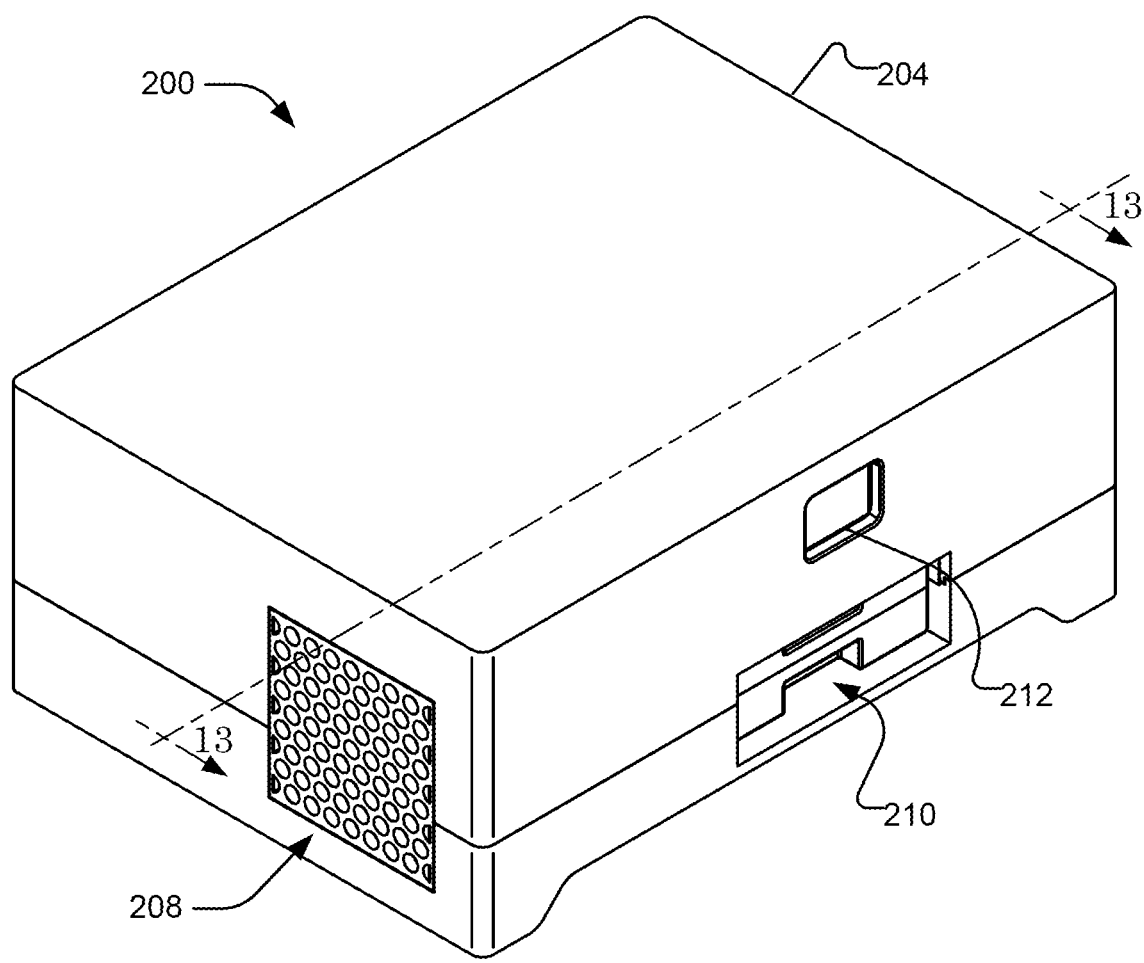
FIG. 10 is a perspective view of a bioaerosol monitoring device in accordance with another embodiment of the present invention.
Figure 11:
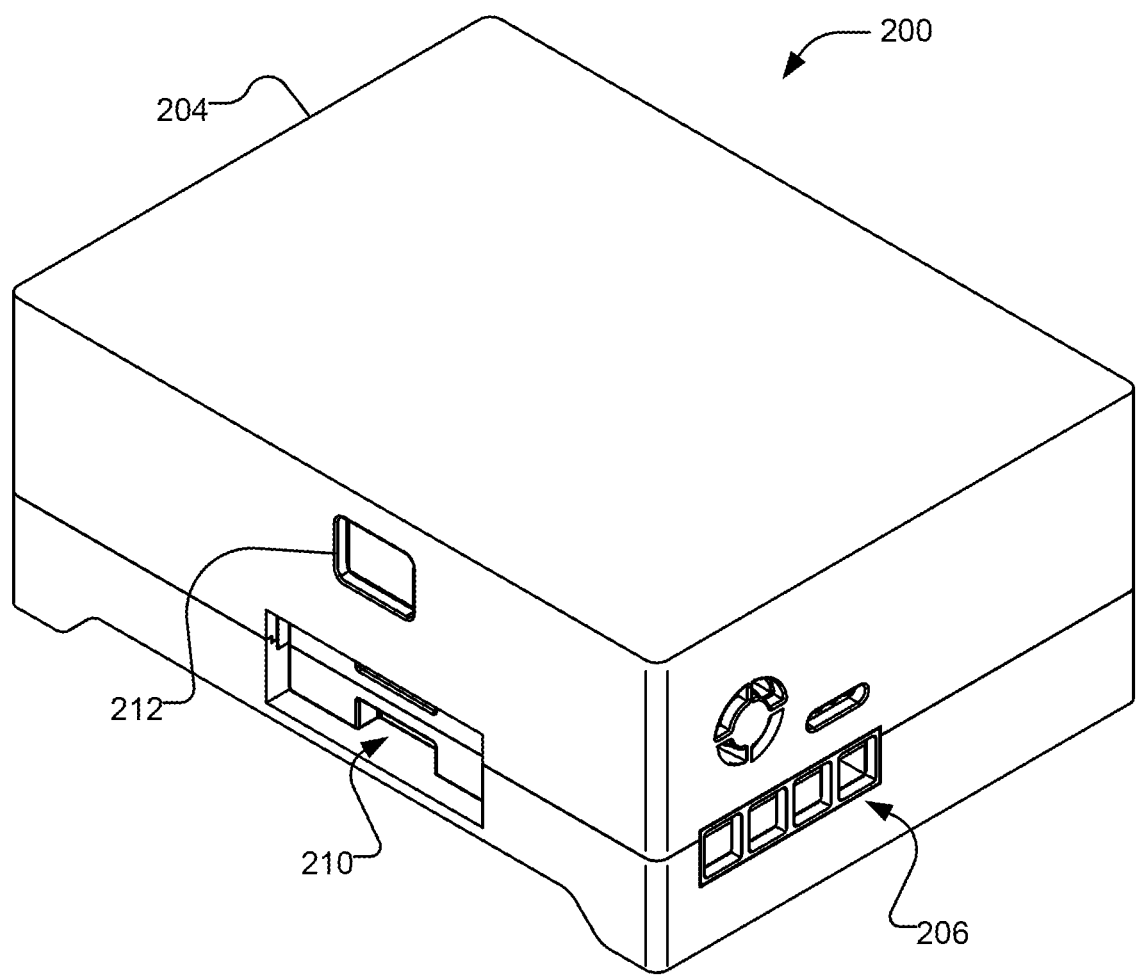
FIG. 11 is another perspective view of the device of FIG. 10.
Figure 12:
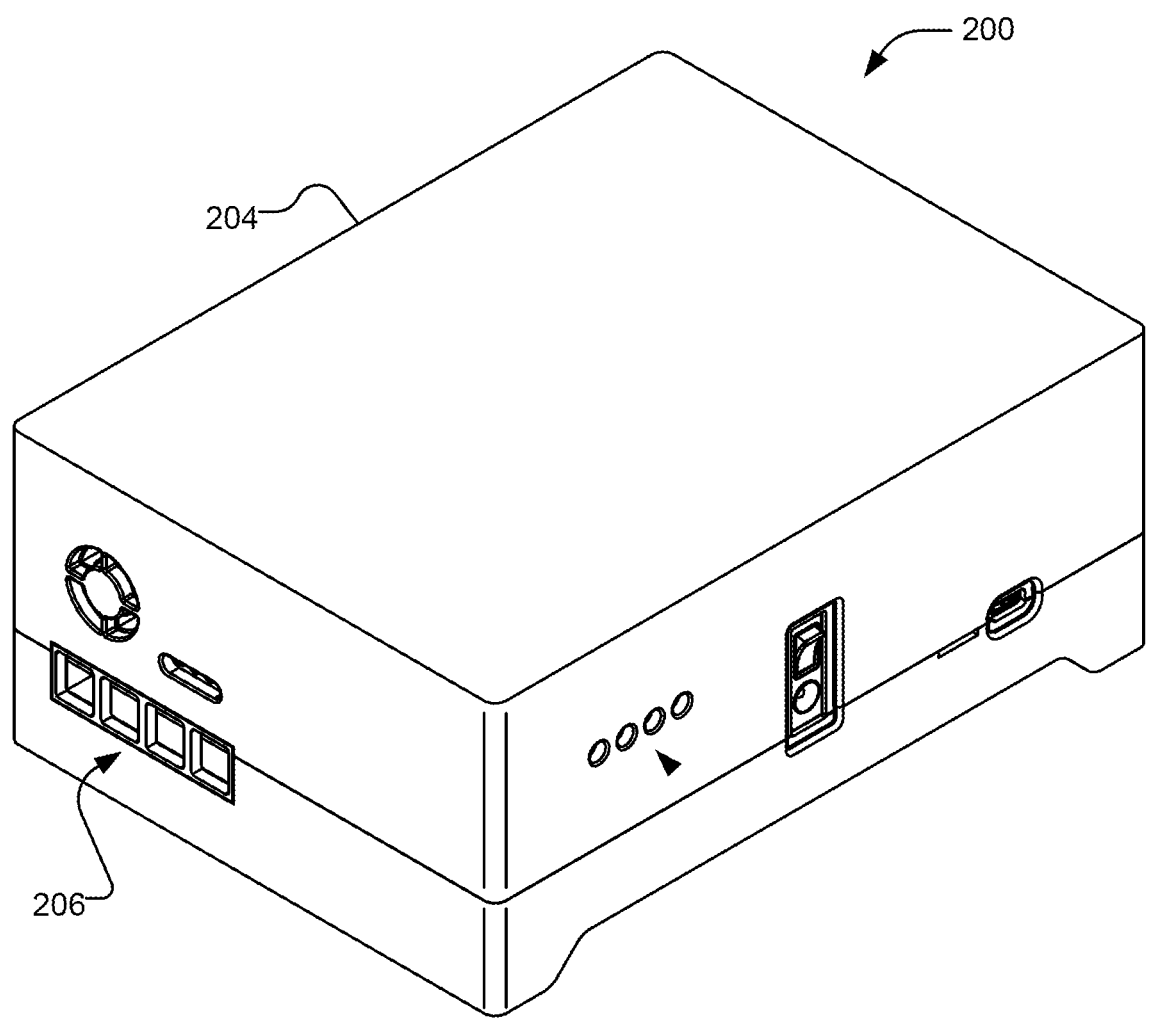
FIG. 12 is another perspective view of the device of FIG. 10.
Figure 13:
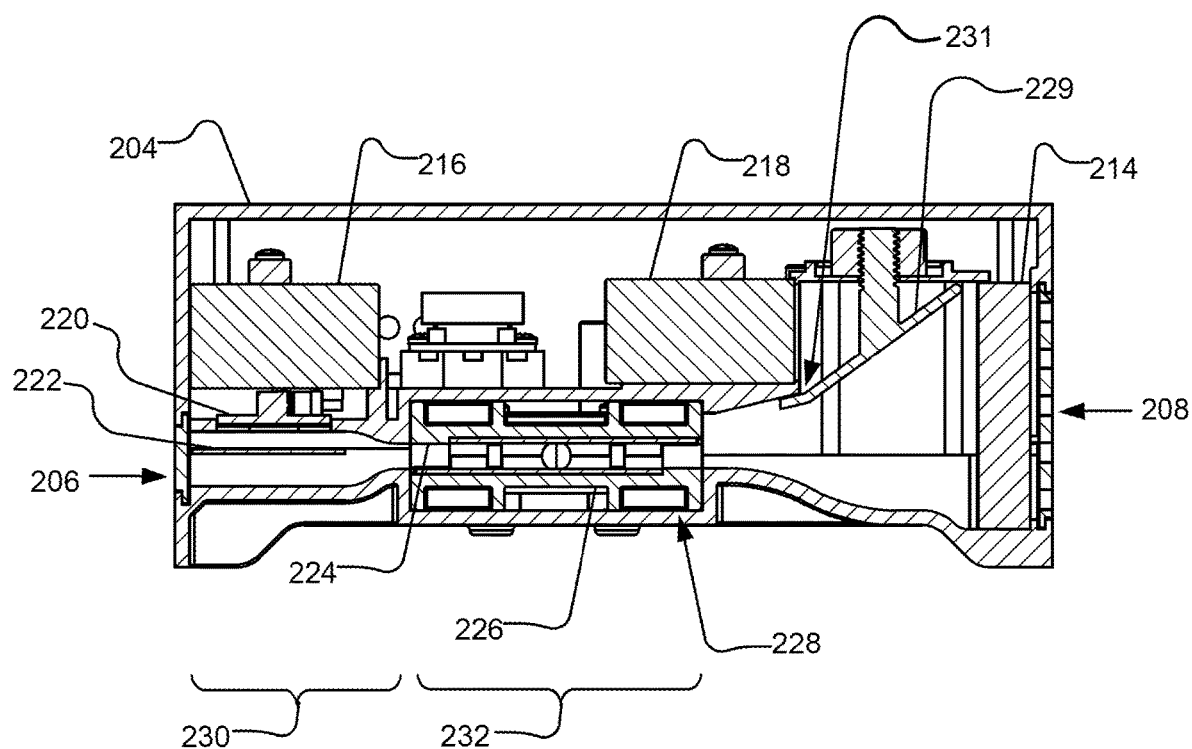
FIG. 13 is a cross section side view of the device shown in FIG. 10.
Figure 14:
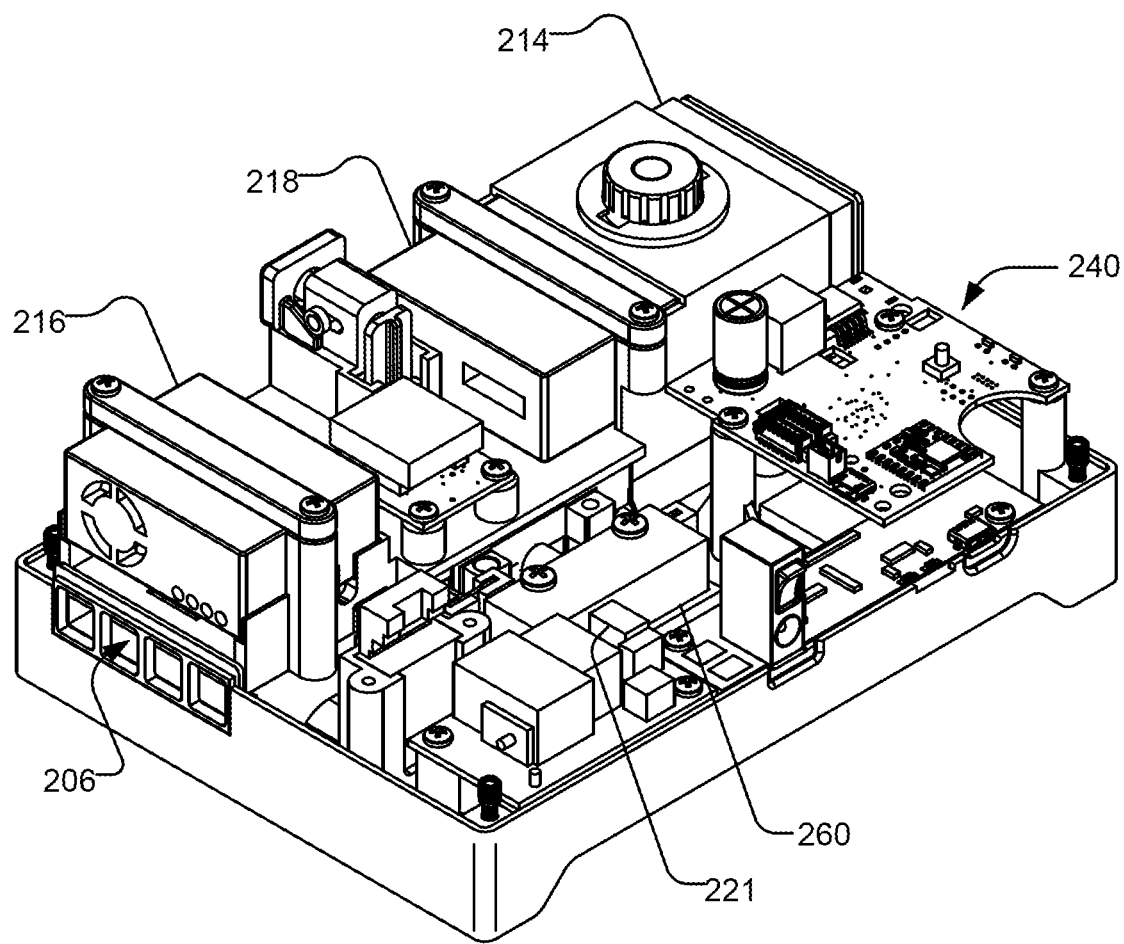
FIG. 14 is a perspective view of the device of FIG. 10 with a top portion of the housing removed to show inner components.
Figure 15:
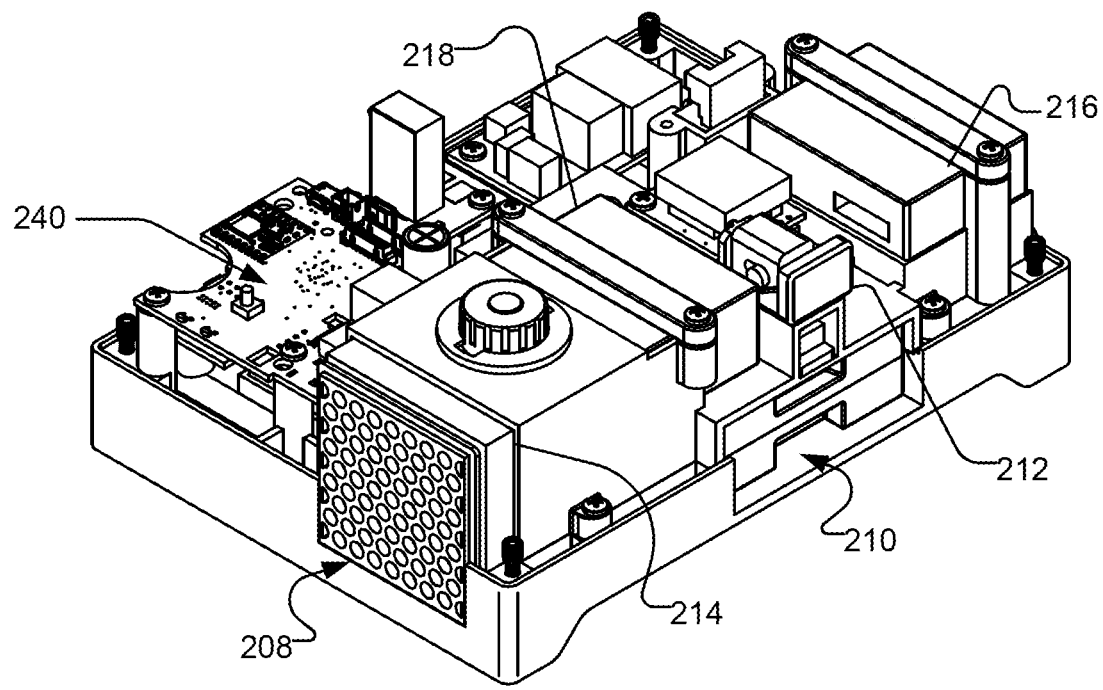
FIG. 15 is another perspective view of the uncovered device of FIG. 14.
Figure 16:
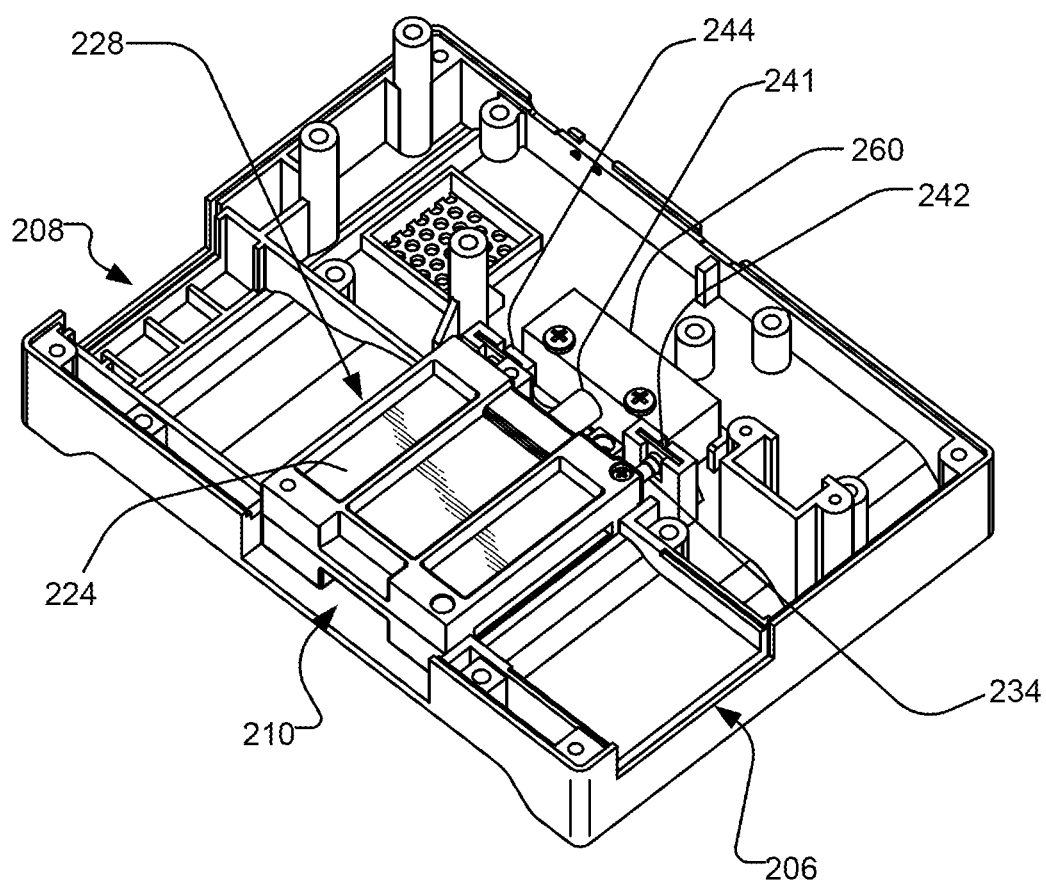
FIG. 16 is a perspective view of the device of FIG. 12 with some of the inner components removed to show a cartridge articulating with the device.
Figure 17:
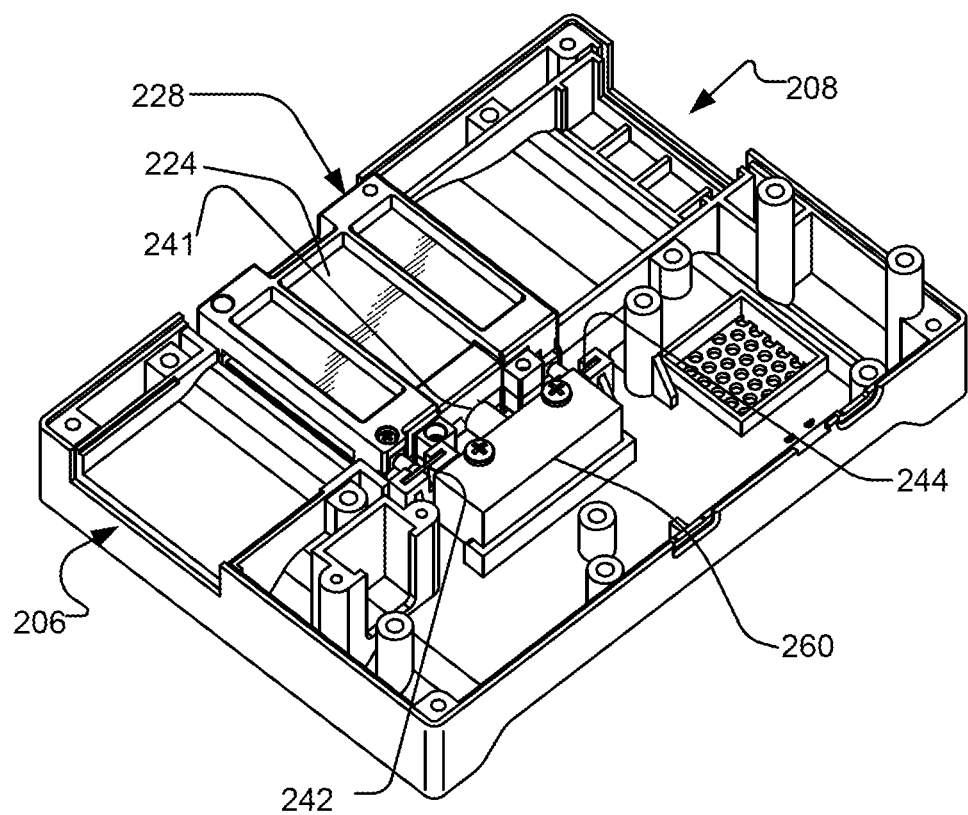
FIG. 17 is another perspective view of the device of the device as shown in FIG. 16.
Figure 18:
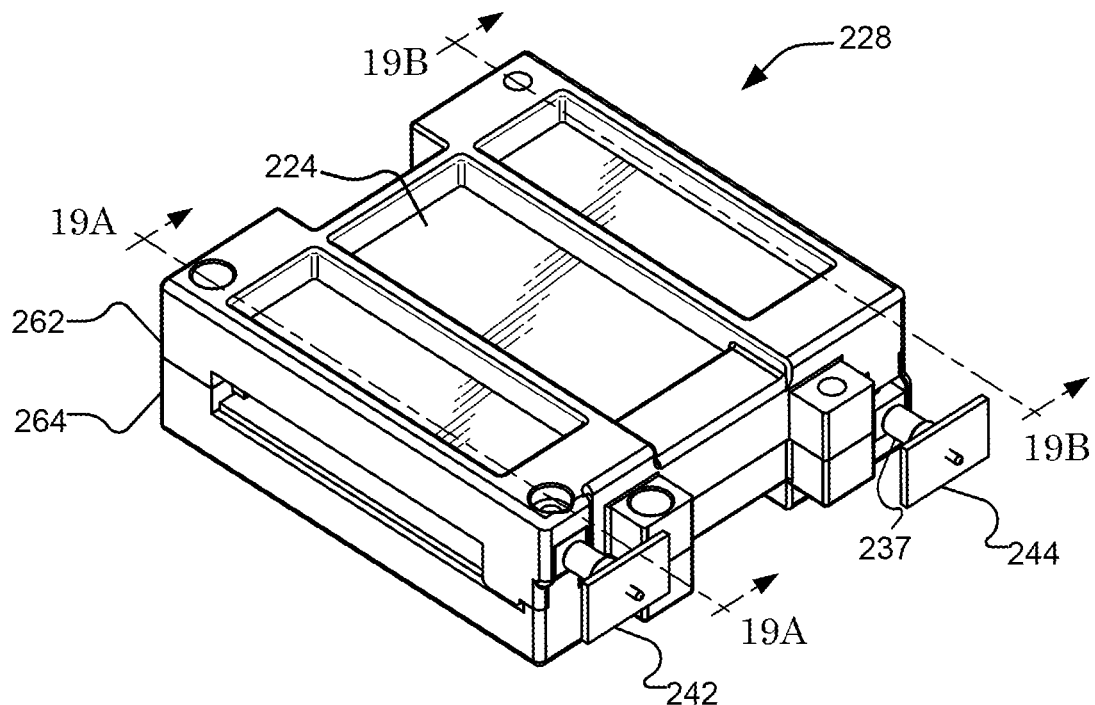
FIG. 18 is a perspective view of a cartridge shown apart from the device.
Figure 19A:
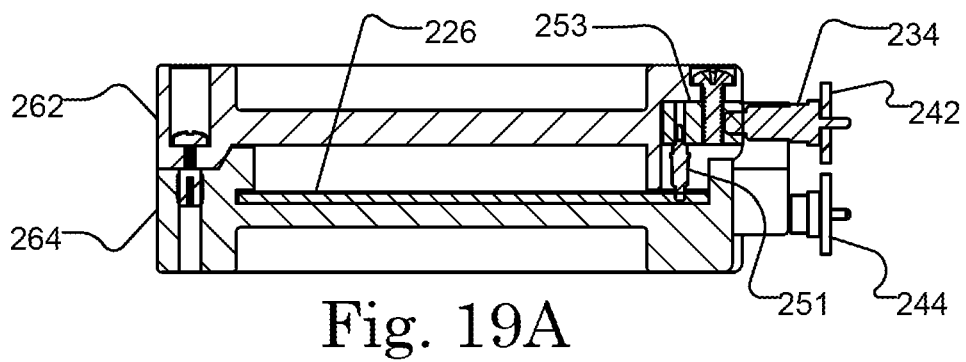
FIGS. 19A-19B are cross section views of the cartridge shown in FIG. 18.
Figure 19B:
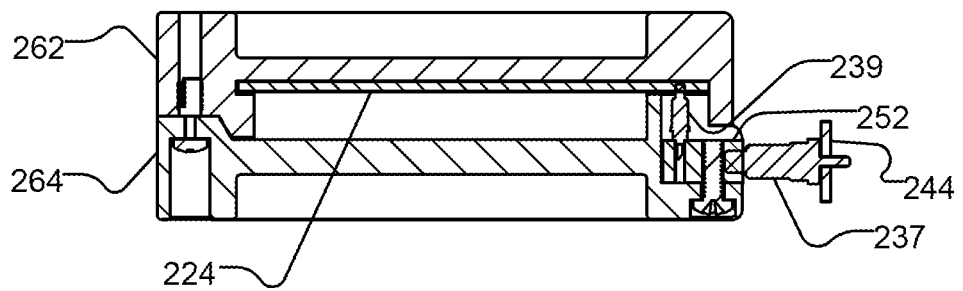
Figure 20:
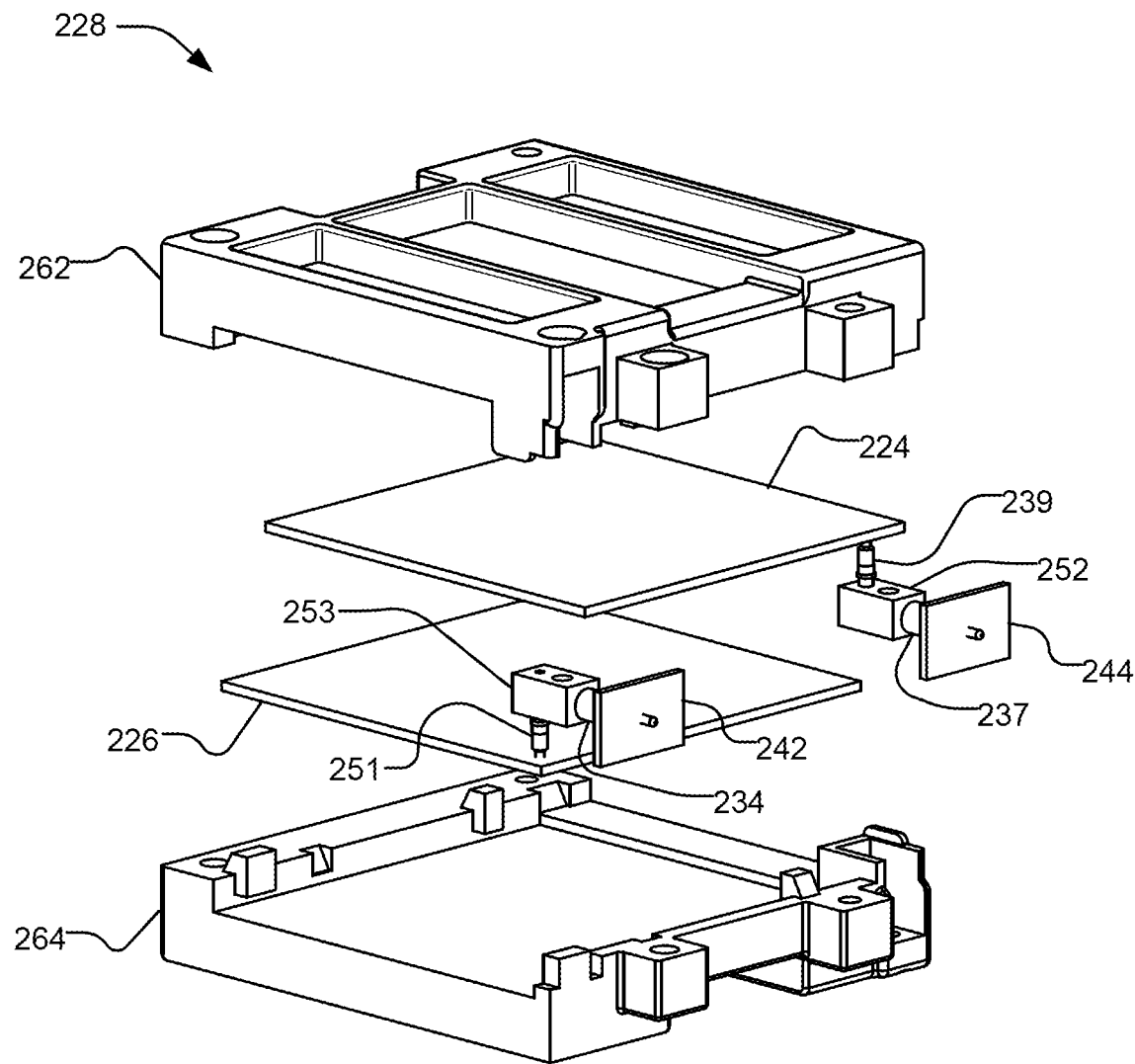
FIG. 20 is an exploded view of the cartridge of FIG. 18.
Figure 21:
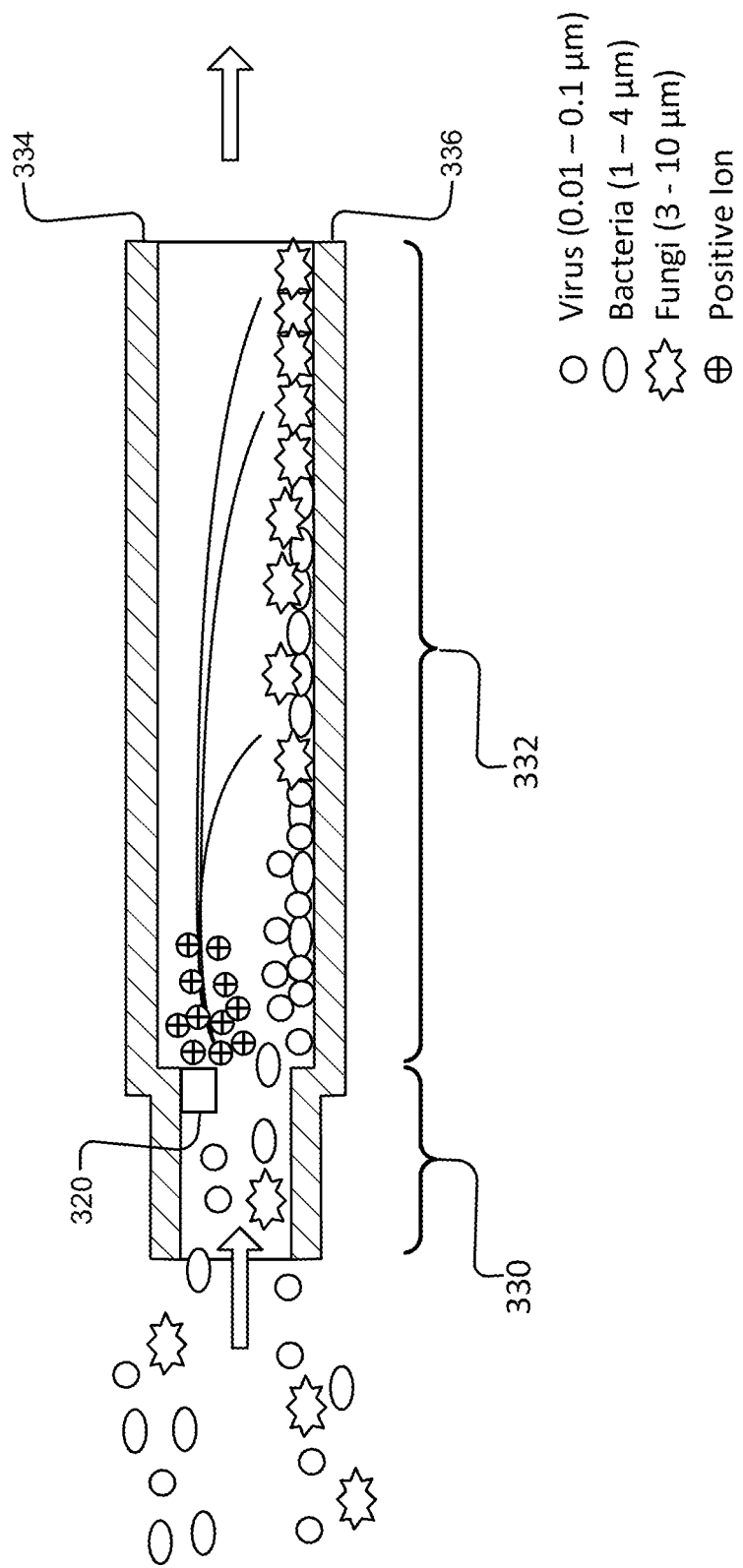
FIG. 21 is a schematic illustration depicting bioaerosols in different zones of a device for bioaerosol monitoring in accordance with an embodiment of the present invention.

A removable cassette 128 (which can be seen in FIGS. 6-9) includes a ground plate 126 received and held in an upper portion 162 of cassette 128 opposite high voltage plate 124 received and held in a lower portion 164 of cassette 128. Cassette 128 is easily inserted into and removed from device 100 via cassette port 110. High voltage plate 124 may be made of any suitable material, such as conductive glass or steel, and ground plate 126 may be made of any suitable material, such as conductive glass or steel, depending on the particles of interest to be collected and/or the type of analysis to be conducted on the collected particles (either within device 100, such as spectral analysis, or later when cassette 128 is sent to another facility, such as microscopy). Cassette 128 can be safely and easily inserted and removed from device 100 in a manner allowing ground plate 126 and voltage plate 124 to electrically engage/disengage with components of device 100. Device 100 includes a limit switch 141 (as can be seen in FIG. 6) that is positioned and configured to be engaged by the rear portion of cassette 128 as cassette 128 is inserted into device 100. When cassette 128 is fully inserted, limit switch 141 activates an actuator 160 that receives power from voltage source 121. One portion of the rear of cassette 128 also engages a connector mechanism, such as a spring-loaded pogo pin 134A, that is electrically connected on one end to ground via a conductor 142, when cassette 128 is inserted. The other end of spring-loaded pogo pin 134A engages with a conductor on the rear of cassette 128 that is electrically coupled to the upward facing face of ground plate 126. In a similar manner, another portion of the rear of cassette 128 engages a spring-loaded pogo pin 134B when inserted into device 100. Spring-loaded pogo pin 134B engages with a conductor 150 that is electrically connected to high voltage from voltage source 121. The other end of spring-loaded pogo pin 134B engages a conductor at the rear of cassette 128 when is inserted that is configured to engage with the downward facing face of high voltage plate 124. (Note that for coated conductive glass plates, the downward facing face will be the coated face.) In this way, high voltage plate 124 will carry the set voltage or be capable of carrying the set voltage when cassette 128 is inserted into device 100 without the user having to perform any additional task beyond inserting cassette 128 into device 100.

In operation, a mixture of biological particles enter device 100 and are ionized with positive charges in ionization region 130 and then are precipitated onto ground plate 126 under an electric field (e.g., 8 kV/cm) generated by high voltage plate 124. Fan 114 draws ambient air into device 100 through inlet port 106 via a low pressure drop. In ionization region 130, ionizer 120 ionizes incoming particles so that they are charged. Particles, including ionized particles, then pass into a precipitation region 132 where voltage applied to high voltage plate 124 creates an electric field gradient between high voltage plate 124 and ground plate 126 when cassette 128 is inserted in device 100 and a selected voltage is sent to high voltage plate 124. It will be noted that the applied voltage can be varied based on desired type of analysis. Further, voltage can be increased such that most or all bioaerosols collected will be killed. In addition, as described more below, device 100 may be linked to a communications network so that device 100 can be controlled remotely and data from device 100 may be collected remotely. In this way, device 100 may be turned on into collection mode, may be turned off, may have the voltage applied to plate 124 adjusted, and may send information indicating that, or used to determine when, cassette 128 should be removed and sent for analysis of the collected particles.

With an electric field in place, ionized particles in the airflow in precipitation region 132 will be drawn towards and collected on ground plate 126. Plated particles may separate along ground plate 126 when precipitated based on particle sizes, with lighter particles being plated earlier than heavier particles. After a selected period of time or after certain threshold number of particles have been estimated to have been collected (as discussed below), cassette 128 can be removed from device 100 and sent for bio-analysis of the particles plated on ground plate 126.

The number of particles collected can be estimated by comparing an incoming number of particles detected (which may be based on size) by first sensor 116 with an outgoing number of particles detected by second sensor 118 over a given period of time while particle collection is occurring. This estimate of the number of collected particles may be determined while collection is occurring and be used to determine when to end the collection process (e.g., by turning off the voltage and/or fan). The estimate of the number of collect particles can also be transmitted by device 100 to other systems for ongoing monitoring and analysis.

Cassette 128 may also include specific identifying information, such as an RFID tag, or other identifying data that allows users to quickly and easily collect and send information about cassette 128, so that the location, date, and time of collecting can be recorded and associated with the cassette during analysis of the collected bioaerosols. In addition, device 100 may be connected to a communications network and include a processor and reader that reads the ID of an inserted cassette. The collection parameters (e.g., time, date, location, duration, voltage, area usage or occupancy) can be associated with a particular cassette and accessed when the cassette is later analyzed in this way, which also allows for real-time monitoring of multiple devices in various locations.

Housing 104 made of any suitable material such as polycarbonate-acrylonitrile butadiene styrene (PC-ABS) as the thermoplastic material in a fused deposition modeling (FDM) based 3D printing platform. Housing 104 is relatively light and compact while accommodating components for aerosol collection, precipitation, and sensing, allowing for the measuring the concentration of aerosol particles and collecting particles by electrostatic precipitation for biological analyses. These components may share common power lines and control units for increased efficiency.

Cooling fans may also be included for cooling components in housing 104. Device 100 may also include a power board 136 that splits an input DC voltage that powers sensors and other electronic components, and a circuit board 140 for regulating the operation of a temperature sensor, RH sensor, Wi-Fi chip, real time clock chip, SD card slot, and a power chip.

Another embodiment is illustrated in FIGS. 10-20, in which a bioaerosol monitoring device 200 is shown that includes a housing 204 having an inlet port 206 on one side (as can be seen in FIGS. 11-12) and an outlet port 208 on an opposite side. In addition, a cartridge or cassette port 210 is included, preferably between inlet port 206 and outlet port 208 and including an ejection button 212 or similar mechanism for ejecting an inserted cassette.

In FIG. 13, a cross sectional view of device 200 is shown, in which an ionization region 230 and a precipitation region 232 are indicated. In addition, a region between precipitation region 232 and outlet 208 is defined by a cone-shaped funnel 229 or similar structure that expands toward outlet 208 to assist with low pressure operation. As can be seen, the path for airflow through device 200 is relatively straight, which minimizes turbulence and the redistribution of particles (e.g., based on size or weight) that can occur when airflow passes through turns or corners.

Turning to FIGS. 14-17, device 200 is shown with a portion of housing 204 removed to show inner components, which include a fan 214 for creating airflow through device 200 (in particular in through inlet port 206 and out through outlet port 208), a first sensor 216 near inlet port 206 for measuring airborne particle concentrations of air coming in to device 200, a second sensor 218 near outlet port 208 for detecting or measuring airborne particle concentrations in air after a portion of particles have been precipitated in device 200, an ionizer 220 (which can been seen in FIG. 13) for ionizing particles as they enter device 200, a divider 222 (which can been seen in FIG. 13) positioned below ionizer 220 that prevents or substantially reduces the percent of particles ionized beneath divider 222, and an electric power source, such as power source 221.

A removable cassette 228 (which can be seen in FIGS. 16-20) includes a lower portion 264 that receives and holds a ground plate 226, which is opposite a high voltage plate 224 that is received and held in an upper portion 262 of cassette 228. Cassette 228 is easily inserted into and removed from device 200 via cassette port 210. High voltage plate 224 may be made of any suitable material, such as conductive glass or steel, and ground plate 226 may be made of any suitable material, such as conductive glass or steel, depending on the particles of interest to be collected and/or the type of analysis to be conducted on the collected particles (either within device 200, such as spectral analysis, or later when cassette 228 is sent to another facility, such as microscopy). Cassette 228 can be safely and easily inserted and removed from device 200 in a manner allowing ground plate 226 and voltage plate 224 to electrically engage/disengage with components of device 200. Device 200 includes a limit switch 241 that is positioned and configured to be engaged by the rear portion of cassette 228 as cassette 228 is inserted into device 200. When cassette 228 is fully inserted, limit switch 241 activates an actuator 260 that receives power from high voltage source 221. One portion of the rear of cassette 228 also engages a connector mechanism, such as a spring-loaded pogo pin 234, that is electrically connected on one end to ground via a conductor, such as brass block 242 or similar. The other end of spring-loaded pogo pin 234 engages with a conductor, such as brass block 253, in cassette 228. Conducting block 253 is electrically coupled to a vertically oriented conductor, such as preferably a spring-loaded pogo pin 251, which is configured to engage with the upward facing face of ground plate 226. In a similar manner, another portion of the rear of cassette 228 engages a spring-loaded pogo pin 237 when inserted into device 200. Spring-loaded pogo pin 237 engages with a conductor, such as brass block 244, that is electrically connected to high voltage of power source 221 via actuator 260. The other end of spring-loaded pogo pin 237 engages a conductor, such as brass block 252, at the rear of cassette 228 when inserted. Brass block 252 is electrically coupled to a vertically oriented conductor, such as in a preferred embodiment spring-loaded pogo pin 239, that is configured to engage with the downward facing face of high voltage plate 224. (Note that for coated conductive glass plates, the downward facing face will be the coated face.) In this way, high voltage plate 224 will carry the set voltage or be capable of carrying the set voltage when cassette 228 is inserted into device 200 without the user having to perform any additional task beyond inserting and removing cassette 228 into device 200. The use of spring-loaded pogo pins to connect the plates of cassette 228 allows for the plates to be removed from cassette 228 for analysis and new plates can be inserted into cassette 228 for further collection. Further, this allows for different plates, e.g., glass, steel, agar coated, to be used in a cassette depending on the type of analysis to be done on the collected particles, e.g., spectral analysis, microscopy, growth of collected articles.

In operation, fan 214 draws ambient air into device 200 through inlet port 206 via a low pressure drop. In ionization region 230, ionizer 220 ionizes incoming particles so that they are charged. Divider 222 may be used to limit or lower the percentage of particles that are ionized beneath divider 222. In this way, ionized particles plated on ground plate 226 (as described below) will be separated in space along ground plate 226 based on particle size. This allows particles of a size range of interest (e.g., viruses) to be grouped spatially on ground plate 226, which allows for ease of analysis, e.g., by microscopy. Since particles above divider 222 will be ionized, all the ionized particles must travel at least the vertical distance from divider 222 to ground plate 226, which allows sufficient time for larger particles to travel farther in the horizontal direction relative to smaller particles, and thus be plated more distally on ground plate 226.

Particles, including ionized particles, then pass into a precipitation region 232 where voltage applied to high voltage plate 224 creates an electric field gradient between high voltage plate 224 and ground plate 226 when cassette 228 is inserted in device 200 and a selected voltage is sent to high voltage plate 224. It will be noted that the applied voltage can be varied based on desired type of analysis. Further, voltage can be increased such that most or all bioaerosols collected will be killed. In addition, as described more below, device 200 may be linked to a communications network so that device 200 can be controlled remotely and data from device 200 may be collected remotely. In this way, device 200 may be turned on into collection mode, may be turned off, may have the voltage applied to plate 224 adjusted, and may send information indicating that, or used to determine when, cassette 228 should be removed and sent for analysis of the collected particles.

With an electric field in place, ionized particles in the airflow in precipitation region 232 will be drawn towards and collected on ground plate 226. As noted above, use of divider 222 allows for plated particles to be separated based on particle sizes, with lighter particles being plated earlier than heavier particles. After a selected period of time or after certain threshold number of particles have been estimated to have been collected (as discussed below), cassette 228 can be removed from device 200 and sent for bio-analysis of the particles plated on ground plate 226.

The number of particles collected can be estimated by comparing an incoming number of particles detected (by size) by first sensor 216 with an outgoing number of particles detected by second sensor 218 over a given period of time while particle collection is occurring. In a preferred embodiment, the upper portion of funnel 229 includes a portal 231 (as shown in FIG. 13) that allows a portion of the airflow to reach second sensor 218 so that, in conjunction with pre-collection measurements made at first sensor 216, an estimate of collected particles can be made. This estimate may be determined while collection is occurring and be used to determine when to end the collection process (e.g., by turning off the voltage and/or fan). The estimate of the number of collect particles can also be transmitted by device 200 to other systems for ongoing monitoring and analysis.

Other materials and components, such as RFID tags and power boards, etc., as discussed above may be used with this embodiment as well.

In operation, as illustrated in FIG. 21, which depicts a schematic cross-sectional view of airflow and particle interactions in an aerosol biocollection device, air flow (indicated as arrows in FIG. 21) is driven by the fan and pulled into ionization region 330 of the device. In ionization region 330, ionizer 320 creates positive ions and the sampled particles mix with the positive ions and get charged. The positively charged particles then enter precipitation region 332 and electrostatically precipitate onto a grounded collection plate 336 that is opposite from and parallel to a positively charged voltage plate 334 (example paths of charged particles are indicated as lines within precipitation region 332). In general, larger particles such as fungi will travel further in precipitation region 332 before reaching the ground plate, smaller particles such as viruses will be precipitated closer to ionization region 330, and intermediate particles such as bacteria will precipitate in a middle range, as depicted in FIG. 19. After operation for a selected time period or until a certain number of particles are collected, collection plate 336 is removed (generally as part of a cassette inserted in the device) and may be placed in a transport container for the sterile transport of the plates from the collection site for further analysis.

Aerosol concentration measurements may be made in the device using a particle sensor, such as a Plantower PMS5003, which provides the number and mass concentration of aerosol in the size range of 0.3 µm to 10 µm. The particle sensor data may be recorded on a SD card and made available via Wi-Fi by integrating the sensor with a microcontroller through a printed circuit board. The circuit board may include a temperature and humidity sensor a real time clock chip, a Wi-Fi chip for the data transmission, an SD card breakout board, and a power chip bridged to the microcontroller. Preferably, the device operates with 12 V DC as the power input and a power splitter board configured to distribute power to all the components of the device.

A fan, such as a 50 mm, 12 V DC fan, is used to draw airflow into the electrostatic precipitator region. The electrostatic precipitator geometry may be preferably designed to have a low pressure drop such that a high sample flow of 10 lit/min is maintained with a small fan. The electrostatic precipitator includes a HV plate and a ground plate placed parallel to each other at a distance, such as 4 mm in a preferred embodiment. The precipitator plates may be made out of printed circuit boards (PCB). Additionally, PCBs allow for integration with downstream circuitry for electrical current measurements. The HV plate is maintained at a voltage (e.g., 5 kV), resulting in an electric field across the precipitation region (e.g., 8 kV/cm). The collection plate may be set to ground potential using a spring-loaded pogo pin. This arrangement allows the collection plate to be easily removed and loaded, without requiring any explicit electrical connection. To ensure that the collection plate can be replaced quickly, it is fastened magnetically to the main body (i.e., housing) of the device. The collection plate and its holder may be adhered to the device housing through evenly spaced magnets. The device may also include a limit switch that automatically shuts down the device when the collection/ground plate is pulled off, thus making the device safer for handlers.

The air ionizer(s) may be oriented perpendicular with respect to the aerosol flow in the ionization region or, preferably, oriented parallel with respect to the aerosol flow.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for collecting bioaerosols comprising:
a housing having a proximal side, a distal side, an inlet port on the proximal side, an outlet port on the distal side, a power source, and a cassette port;
a fan configured to draw air into the housing through an airflow path from the inlet port and out the outlet port, wherein the airflow path is bounded on a first side along a length of the airflow path and on a second side opposite the first side along the length;
an ionizer positioned on the first side and configured to ionize particles entering through the inlet port; and
a cassette configured to be received in the cassette port and including:
a voltage plate electrically coupled to the power source only when the cassette is inserted into the housing, wherein the voltage plate is positioned on the first side when the cassette is inserted into the housing;
a ground plate opposite the voltage plate, wherein the ground plate is on the second side when the cassette is inserted into the housing
wherein the ionizer is proximal to the voltage plate and the ground plate, wherein particles ionized by the ionizer flowing through the apparatus are precipitated on the ground plate when the voltage plate is charged, and wherein the apparatus includes no other ground plates positioned to capture the ionized particles from the airflow path.

2. The apparatus of claim 1, further including a first sensor near the inlet port that detects airborne particles before the airborne particles pass the ionizer and a second sensor near the outlet port for detecting airborne particles after the airborne particles pass the ground plate.

3. The apparatus of claim 2, further including a funnel between the ground plate and the outlet port, wherein the funnel expands from the ground plate to the outlet port and includes a portal configured to allow air to pass to the second sensor.

4. The apparatus of claim 2, wherein the first sensor measures a number and mass concentration of aerosol in a size range of 0.3 µm to 10 µm and wherein the second sensor measures a number and mass concentration of aerosol in a size range of 0.3 µm to 10 µm.

5. The apparatus of claim 2, further including a divider in the airflow path proximal to the ground plate and positioned between the first side and the second side extending along a length of the ionizer forming a first air channel between the divider and the ionizer and a second air channel between the divider and the second side such that the divider is between the second air channel and the ionizer in an ionization region of the airflow path.

6. The apparatus of claim 2, wherein the voltage plate is charged to 5000 V DC.

7. The apparatus of claim 2, wherein an electric field between the voltage plate and the ground plate is 8 kV/cm.

8. The apparatus of claim 2, wherein air is drawn through the apparatus at 10 lit/min.

9. The apparatus of claim 2, wherein the ground plate and the voltage plate are separated by 4 mm.

10. The apparatus of claim 2, wherein the cassette engages a limit switch when inserted into the apparatus such that the limit switch actuates the power source.

11. The apparatus of claim 10, wherein, when the cassette is inserted in the apparatus, a first conductive contact member engages the voltage plate on one end and is electrically coupled to the power source on another end.

12. The apparatus of claim 11, wherein, when the cassette is inserted in the apparatus, a second conductive contact member engages the ground plate on one end and is electrically coupled to ground on another end.

13. The apparatus of claim 12, wherein the first conductive contact member includes a first horizontally oriented spring-loaded pin that is electrically coupled to the power source when the cassette is inserted in the apparatus.

14. The apparatus of claim 13, wherein the first conductive contact member includes a first vertically oriented spring-loaded pin that is electrically coupled to a downward facing face of the voltage plate and is electrically coupled to the power source only when the cassette is inserted in the apparatus.

15. The apparatus of claim 14, wherein the second conductive contact member includes a second horizontally oriented spring-loaded pin that is electrically coupled to ground when the cassette is inserted in the apparatus.

16. The apparatus of claim 15, wherein the second conductive contact member includes a second vertically oriented spring-loaded pin that is electrically coupled to an upward facing face of the ground plate and is electrically coupled to ground through the apparatus only when the cassette is inserted in the apparatus.

17. The apparatus of claim 16, wherein the ground plate is conductive glass.

18. The apparatus of claim 2, wherein the cassette includes an RFID tag.

19. The apparatus of claim 2, wherein the cassette is secured in the housing via a magnetic plate.

20. The apparatus of claim 2, wherein a path from the inlet port to the outlet port is straight.

* * * * *